(12) United States Patent
Foschini et al.

(10) Patent No.: US 9,241,276 B2
(45) Date of Patent: Jan. 19, 2016

(54) METHOD FOR ADAPTIVE FORMATION OF CELL CLUSTERS FOR CELLULAR WIRELESS NETWORKS WITH COORDINATED TRANSMISSION AND RECEPTION

(75) Inventors: G. J. Foschini, South Amboy, NJ (US); Howard C. Huang, New York, NY (US); Angel Lozano, Barcelona (ES); Reinaldo Valenzuela, Holmdel, NJ (US); Sivarama Venkatesan, Milltown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1011 days.

(21) Appl. No.: 12/140,537

(22) Filed: Jun. 17, 2008

(65) Prior Publication Data

US 2009/0312027 A1 Dec. 17, 2009

(51) Int. Cl.
*H04W 4/00* (2009.01)
*H04W 24/02* (2009.01)
*H04W 16/02* (2009.01)

(52) U.S. Cl.
CPC .............. *H04W 24/02* (2013.01); *H04W 16/02* (2013.01)

(58) Field of Classification Search
CPC .. H04W 36/30; H04W 36/08; H04W 36/0083
USPC ......................................................... 455/446
See application file for complete search history.

(56) References Cited

U.S. PATENT DOCUMENTS

| | | | |
|---|---|---|---|
| 4,335,468 A * | 6/1982 | Foster et al. | 455/501 |
| 6,600,758 B1 * | 7/2003 | Mazur et al. | 370/508 |
| 2002/0054611 A1 * | 5/2002 | Seta | 370/503 |
| 2006/0009158 A1 * | 1/2006 | Bernhard et al. | 455/67.11 |
| 2007/0280175 A1 | 12/2007 | Cheng et al. | |
| 2008/0268844 A1 * | 10/2008 | Ma et al. | 455/436 |

* cited by examiner

*Primary Examiner* — Vladimir Magloire
*Assistant Examiner* — Shantell L Heiber
(74) *Attorney, Agent, or Firm* — Davidson Sheehan LLP

(57) ABSTRACT

The present invention provides a method of forming clusters of cells in a wireless communication system. The method includes accessing information generated by measuring channel conditions for at least one mobile unit and a plurality of cells in the wireless communication system. The method also includes adding more than one of the plurality of cells to at least one cell cluster based on the accessed information and coordinating communication between the cells in each cell cluster and the mobile unit(s).

23 Claims, 4 Drawing Sheets

METHOD FOR ADAPTIVE FORMATION OF CELL CLUSTERS FOR CELLULAR WIRELESS NETWORKS WITH COORDINATED TRANSMISSION AND RECEPTION

BACKGROUND OF THE INVENTION

1. Field of the Invention

This invention relates generally to communication systems, and, more particularly, to wireless communication systems.

2. Description of the Related Art

Wireless communication systems typically include a plurality of base stations or access points that provide wireless connectivity to mobile units within a geographical area that is usually referred to as a cell. The air interface between the base station or access point and the mobile unit supports one or more downlink (or forward link) channels from the base station to the mobile unit and one or more uplink (or reverse link) channels from the mobile units to the base station. The uplink and/or downlink channels include traffic channels, signaling channels, broadcast channels, paging channels, pilot channels, and the like. The channels can be defined according to various protocols including time division multiple access (TDMA), frequency division multiple access (FDMA), code division multiple access (CDMA), orthogonal frequency division multiple access (OFDMA), as well as combinations of these techniques. The geographical extent of each cell may be time variable and may be determined by the transmission powers used by the base stations, access point, and/or mobile units, as well as by environmental conditions, physical obstructions, and the like.

Mobile units are assigned to base stations or access points based upon properties of the channels of supported by the corresponding air interface. For example, in a traditional cellular system, each mobile unit is assigned to a cell on the basis of criteria such as the uplink and/or downlink signal strength. The mobile unit then communicates with that serving cell over the appropriate uplink and/or downlink channels. Signals transmitted between the mobile unit and the serving cell may interfere with communications between other mobile units and/or other cells. For example, mobile units and/or base stations create intercell interference for all other sites that use the same time/frequency resources. The increasing demand for wireless communication resources has pushed service providers towards implementing universal resource reuse, which increases the likelihood of intercell interference. In fact, the performance of modern systems is primarily limited by intercell interference, which dominates the underlying thermal noise.

Although conventional wireless communication systems attempt to reduce the effects of intercell interference using various interference cancellation techniques, alternative approaches recognize that intercell "interference" is actually caused by signals that include valuable information. For example, on the uplink, intercell interference at one cell site is merely a superposition of signals that were intended for other cell sites, i.e., the intercell interference is formed of mobile unit signals that have been collected at the wrong place. If these signals could be properly classified and routed, they would cease to be interference and would become useful in the detection of the information they bear. While challenging, combining information received at disparate sites is theoretically possible because the cell sites are connected to a common and powerful backbone network. This is tantamount to recognizing that a network of wireless cell sites can form a large distributed multi-access channel and all users can be served through all the cell sites. This ambitious approach, which has been termed "Network Multiple-In-Multiple-Out" or "Network MIMO", leverages the almost unlimited bandwidth available in wireline networks to transcend intercell interference and alleviate the wireless bottleneck.

A complete implementation of Network MIMO requires that all the cell sites in a system are tightly coordinated both in reception (uplink) and in transmission (downlink). However, wireless signals become progressively weaker as they propagate outward from the cell site. Consequently, coordination may be restricted to clusters of cell sites with minimal performance degradation of the Network MIMO system. Reducing the coordination from the entire system to predetermined clusters of cell sites can substantially reduce the backbone traffic required to coordinate operation of the cells.

FIG. 1 conceptually illustrates a static cell cluster pattern for a conventional network MIMO system 100. The system 100 includes a plurality of cells 105 that are grouped into clusters 110. In the interest of clarity only a single cell 105 and a single cluster 110 are explicitly referred to using the identifying numerals. Although not explicitly shown in FIG. 1, persons of ordinary skill in the art will appreciate that each cell 105 includes one or more base stations and/or access points for providing wireless coverage to the cell 105. Accordingly, the term "cell" may be used herein to refer to the geographic area and/or the corresponding base station. The clusters 110 shown in FIG. 1 are disjoint and each of them contains 3 cells. For example, one cluster 110 includes the cells 1, 3, 5 and an adjacent cluster includes the cells 2, 6, 14. The membership of cells 105 and the various clusters 110 is predetermined based upon factors such as the geography of the region including the cells 105 and/or the clusters 110. Mobile units may then be assigned to clusters 110 on the basis of factors such as the received signal powers and/or a total interference at the cells 105 in each cluster 110.

The decay in the signal strength that makes clustering feasible is, however, randomized by fading, which may vary over time and frequency. As a result, signals traveling the same distance in different parts of a given system may encounter differences of several tens of dB in attenuation because of distinct fading. Signals traveling through the same part of the system at different times may also experience different fading. For example, signals traveling from a given point in distinct directions may encounter differences of several tens of dB in attenuation. As a result, the signal strength received by cell sites (over the uplink) and/or mobile units (over the downlink) is a variable function of the environment. However, the predetermined cluster definitions cannot account for the variability of channel conditions associated with each mobile unit and/or cell site.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for forming clusters of cells in a wireless communication system. The method includes accessing information generated by measuring channel conditions for at least one mobile unit and a plurality of cells in the wireless communication system. The method also includes adding more than one of the plurality of cells to at least one cell cluster based on the accessed information and coordinating communication between the cells in each cell cluster and the mobile unit(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1:
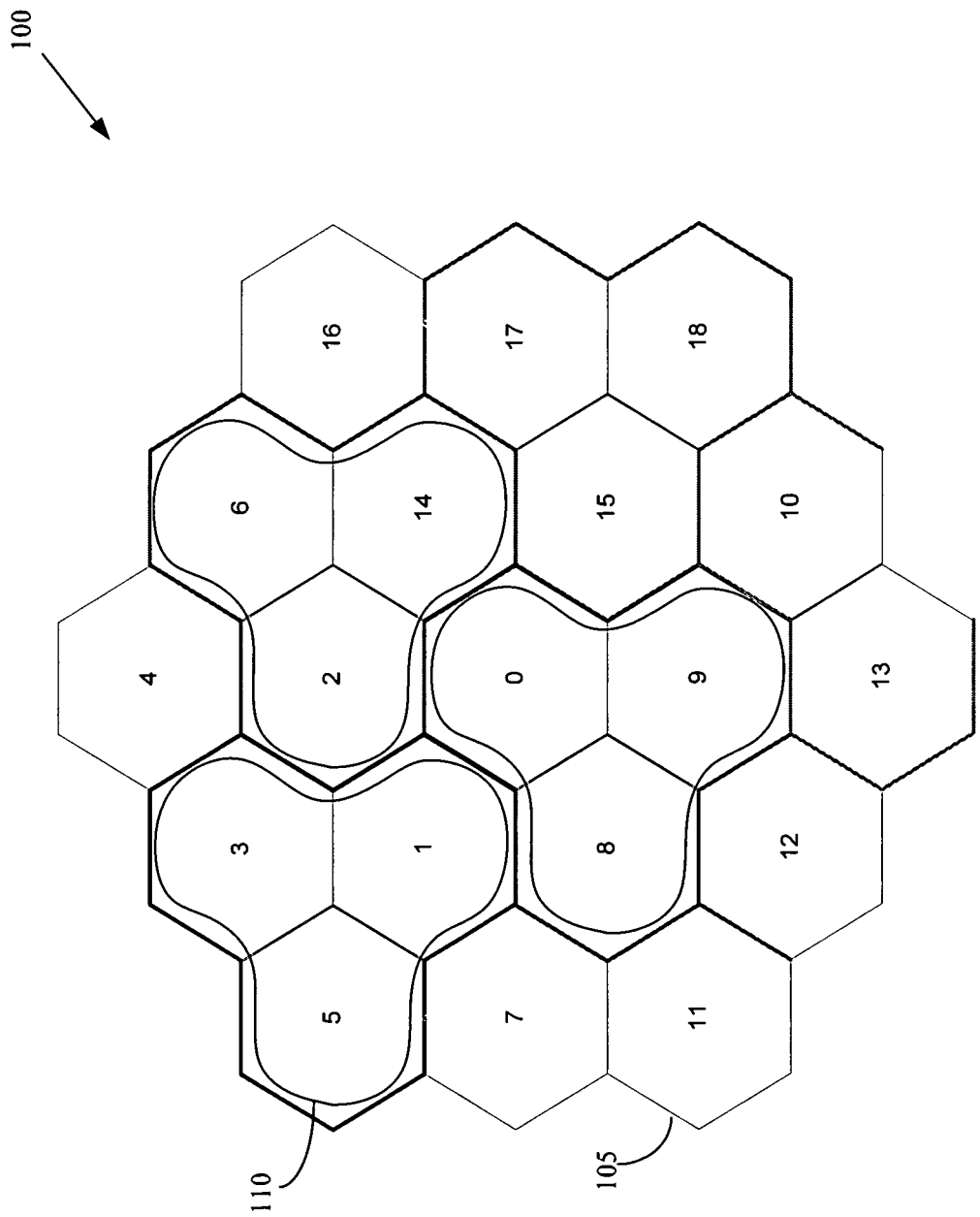
FIG. 1 conceptually illustrates a static cell cluster pattern for a conventional network MIMO system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
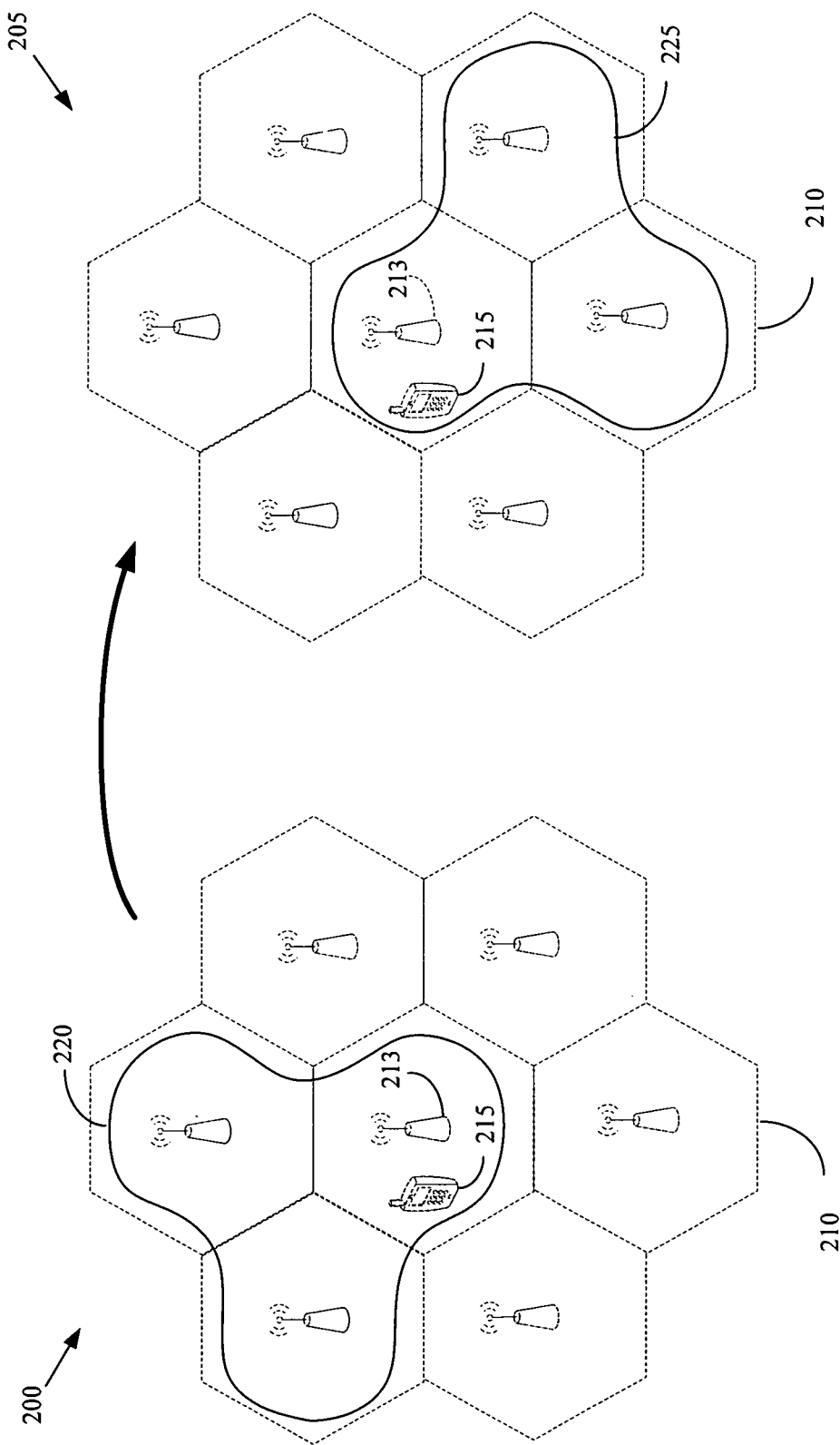
FIG. 2 conceptually illustrates a first exemplary embodiment of dynamic cell clustering in a network MIMO system.

FIG. 2 conceptually illustrates a first exemplary embodiment of dynamic cell clustering in a network MIMO system. The first exemplary embodiment shows a first cluster pattern 200 and a second cluster pattern 205. The cluster patterns 200, 205 include a plurality of cells 210 (only one indicated by a numeral in FIG. 2). One or more base stations and/or access points 213 are used to provide wireless coverage in each cell 210. Accordingly, the techniques for coordinating operation of the cells 210 described herein are intended to refer to coordinating operation of the base stations and/or access points 213 that provide wireless connectivity to the geographic areas associated with the cells 210. Although the mobile unit 215 is depicted as being located in one of the cells 210, persons of ordinary skill in the art having benefit of the present disclosure should appreciate that cell boundaries are not strictly defined (or regular or static) and more than one of the cells 210 may be able to provide wireless connectivity to the mobile unit 215. Consequently, groups of cells 210 and the associated base stations 213 may be used to provide or support coordinated communication with the mobile unit 215. Using multiple cells 210 to support coordinated communication is conventionally referred to as network MIMO. Groups of cells 210 that are used to provide coordinated communication to one or more mobile unit 215 may be referred to herein as "cell clusters," although other equivalent terms may alternatively be used.

The first cluster pattern 200 includes a first cell cluster 220 that includes a plurality of cells 210. The first cell cluster 220 is used to provide coordinated communication with the mobile unit 215 during a first time interval. In one embodiment, the first cluster pattern 200 is a predefined or default cluster pattern 200 that may be used to provide wireless connectivity to the mobile unit 215 when the mobile unit 215 first initiates communication with the system. Alternatively, the first cluster pattern 200 can be a dynamically determined cluster pattern that was formed during one or more previous iterations of the dynamic cluster patterning technique described herein. Although the first cluster pattern 200 includes a cell cluster 220 composed of three cells 210, persons of ordinary skill in the art having benefit of the present disclosure should appreciate that the present invention is not limited to this number and alternative embodiments of the cell cluster 220 may include any number of cells 210. Moreover the cells in a cluster pattern or cell cluster need not be geographically contiguous. Further, in embodiments of the system that implement sectored cells, the clusters could be of individual sectors and not entire cells (so two sectors of the same cell could belong to different clusters).

The first cluster pattern 200 associated with the mobile unit 215 may be dynamically and/or adaptively modified in response to changing channel conditions. In the illustrated embodiment, measurements of channel conditions associated with communication over the air interface between the cells 210 and the mobile unit 215 are used to dynamically modify membership in the cluster patterns. For example, the base stations and/or access points 213 in each of the cells 210 can monitor pilot signals transmitted by the mobile unit 215, interference, and/or noise measured on the communication channels. These measurements may be used to define parameters such as a signal-to-interference-plus-noise ratio (SINR) for the uplink channels from the mobile unit 215 to the cells 210. The cells 210 that have the highest values of the SINR can be added to the cluster pattern and cells 210 that have lower values of the SINR may be removed from the cluster pattern. For example, variations in the channel conditions may result in the first cluster pattern 200 be modified to form the second cluster pattern 205 by removing some cells 210 and adding other cells 210 to form the second cell cluster 225. Although the first and second cell clusters 220, 225 have the same number of cells 210, persons of ordinary skill in the art having benefit of the present disclosure should appreciate that this is not required for the practice of the techniques described herein. In alternative embodiments, the number of cells 210 in the clusters 220, 225 may increase or decrease as cell membership is dynamically and/or adaptively modified.

In the illustrated embodiment, dynamic modification of the cluster patterns is discussed in the context of uplink channels from the mobile unit 215 to the base stations and/or access points 213 in the cells 210. However, persons of ordinary skill in the art having benefit of the present disclosure should appreciate that these techniques apply equally well to defining cluster patterns associated with downlink channels from the base stations and/or access points 213 to the mobile unit 215. For example, in the case of time division multiplexed communication, reciprocity of the uplink and downlink channels implies that measurements of the uplink and/or downlink channel conditions can be used to determine channel conditions in the opposite direction. Accordingly, cell clusters can be defined for both the uplink and downlink directions using measurements in one direction. For another example, in the case of frequency division multiplexed communication, the fading properties of the uplink and or downlink channels may differ and so each mobile unit 215 may be associated with an uplink cell cluster and a downlink cell cluster. The uplink and downlink cell clusters may or may not include the same cells 210. Furthermore, membership of cells 210 in the uplink and downlink cell clusters may vary independently over time.

Dynamic modification of membership in the cluster patterns 200, 205 may be performed on different time scales. In one embodiment, cells 210 may be clustered based upon instantaneous measurements of signal strength performed by the base stations and/or access points 213. Measurements of the channel conditions in this embodiment would therefore take into account distance-dependent path loss, shadow fading, and multipath fading. The instantaneous signals levels may not be reciprocal and thus, in this embodiment, uplink and downlink cell clusters may have distinct cluster structures. The coherence distance of the multipath fading process is on the order of centimeters. At typical speeds expected for mobile unit 215, this coherence distance translates to a coherence time that may range from milliseconds to tens of milliseconds. Thus, the cluster structures would have to be updated at a rate that corresponds to these coherence times.

In one alternative embodiment, cells 210 may be clustered based upon a local average of the signal strength. In this approach, the identity of the cells 210 composing the clusters 220, 225 may be determined on the basis of distance-dependent path loss and shadow fading. Multipath fading is not accounted for. The local averages of the signal strength can be determined by applying suitable short-term averages to the instantaneous signal strength measurements. Since the short-term average power is reciprocal for uplink and downlink, in this embodiment the structure of the clusters 220, 225 may be the same for the uplink and downlink. The coherence distance of the shadow fading process is on the order of at least a few meters and, more often, tens of meters. At typical mobile speeds, this translates to a coherence time of a few seconds. Hence, in this embodiment the clusters would have to be updated much less frequently than in the embodiments that use the instantaneous signal strength and this approach may therefore require less bandwidth on the backhaul network to coordinate the communication between the cells 210 in the cell cluster 225.

Figure 3:
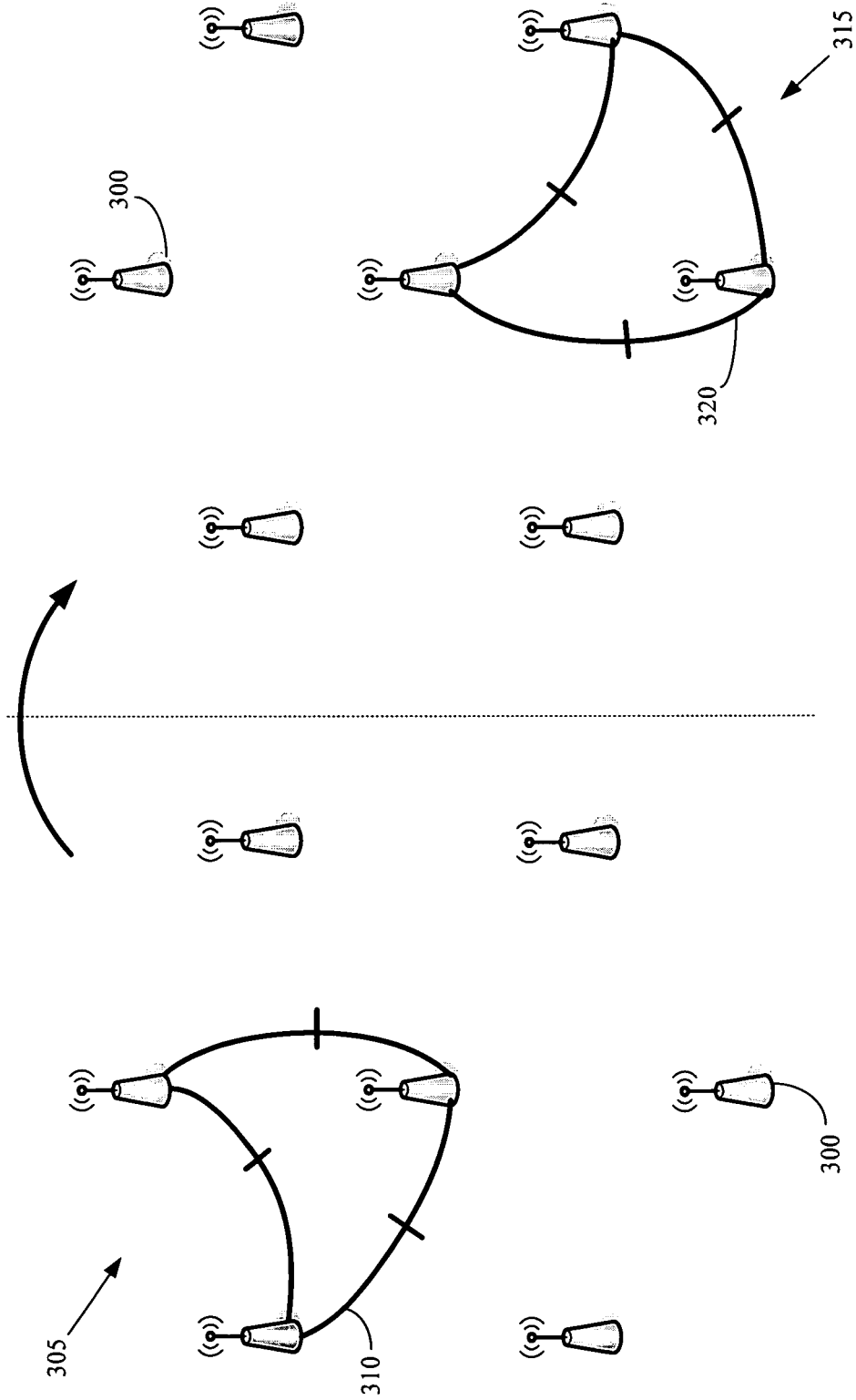
FIG. 3 conceptually illustrates a second exemplary embodiment of dynamic cell clustering in a network MIMO system.

FIG. 3 conceptually illustrates a second exemplary embodiment of dynamic cell clustering in a network MIMO system. The second exemplary embodiment depicts base stations or access points 300 that may correspond to the cells 210 shown in FIG. 2. In the illustrated embodiment, a first cell cluster 305 is formed by connecting a selected group of access points 300 using interfaces 310. The interfaces 310 may be defined according to any standards and/or protocols and may consist of wired and/or wireless connections. Wireless communication over uplink and/or downlink channels can be coordinated using signals transmitted over the interfaces 310. For example, a timing reference signal may be communicated over the interfaces 310 and used to synchronize communications that are supported by the cells 300 in the first cell cluster 305. Other information, including data transmitted and/or received over the air interface may also be exchanged using the interfaces 310.

Membership in the cell clusters can be dynamically and/or adaptively modified, e.g., in response to changing channel conditions, as discussed herein. When the changing channel conditions result in modification of membership in one or more cell clusters, interconnections between the access points 300 may also be modified. In the illustrated embodiment, the first cell cluster 305 can be modified to form the second cell cluster 315 by adding some access point 300 and removing other access points 300. The interfaces 310 may be torn down and interfaces 320 may be established to facilitate communication between the access point 300 and the second cell cluster 315. As discussed above, dynamic and/or adapted modification of the access points 300, as well as the associated interfaces 310, 320, to be performed on different time scales. Furthermore, in some embodiments, membership in cell clusters and the structure of the associated interfaces may be different for uplink cell clusters and downlink cell clusters.

Figure 4:
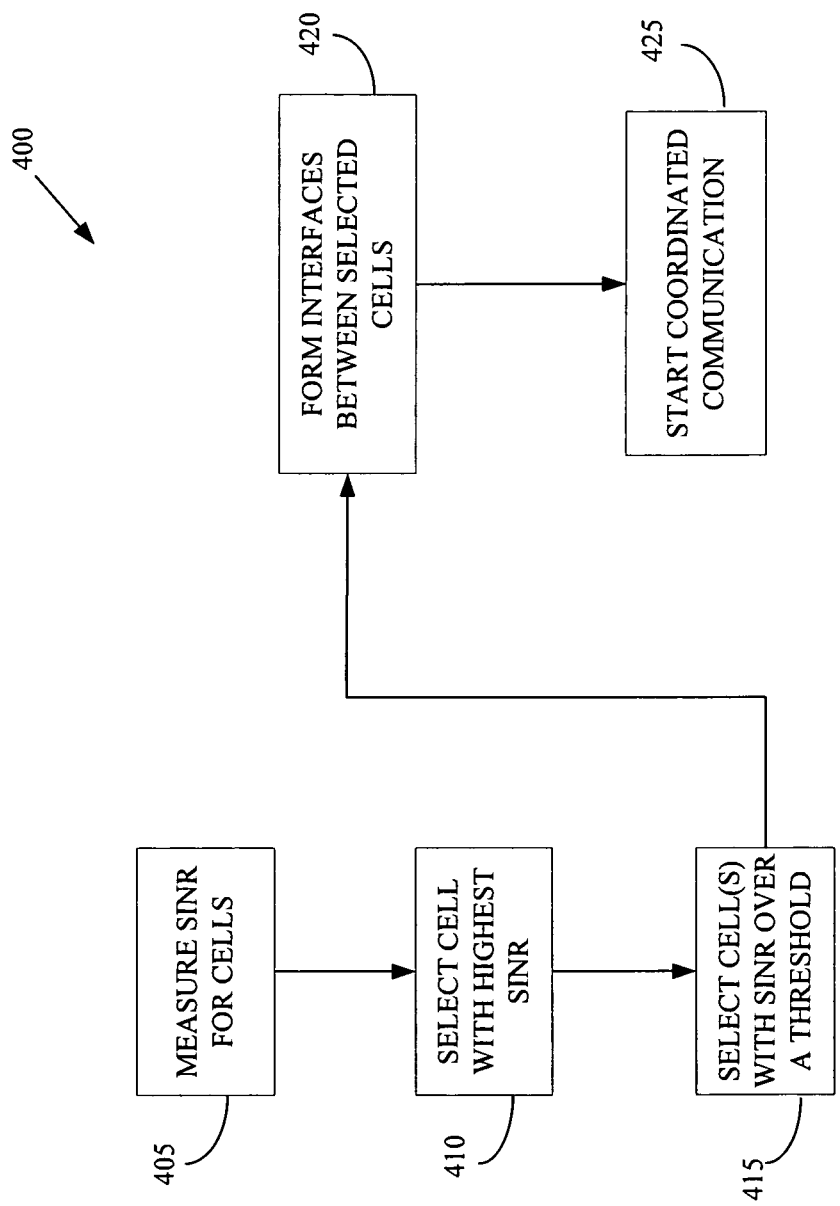
FIG. 4 conceptually illustrates one exemplary embodiment of a method of dynamic cell clustering in a network MIMO system.

FIG. 4 conceptually illustrates one exemplary embodiment of a method 400 of dynamic cell clustering in a network MIMO system. In the illustrated embodiment, the signal-to-interference-plus-noise ratio (SINR) is used as the parameter that indicates the channel conditions between mobile units and cell sites. However, persons of ordinary skill in the art having benefit of the present disclosure should appreciate that other parameters may alternatively be used. For example, the signal strength or the interference level at the cell site and/or location of the mobile unit may be used independently as the indication of the channel conditions. For another example, measurements of the signal strength, the interference level, and/or the noise level may be combined to form other parameters that indicate the channel conditions and/or the probability that signals transmitted over a given channel can be decoded. The parameters indicative of the channel conditions may change depending on the context and different parameters may be used for the uplink and downlink channels.

In the illustrated embodiment, measurements of the SINR are performed (at 405) for each cell site and/or mobile unit. Cell sites can measure (at 405) the SINR for the uplink (and the downlink in a time division multiplex system) using pilot signals transmitted by one or more mobile units. The mobile units can measure (at 405) the SINR for the downlink (and the uplink in a time division multiplex system) using broadcast signals from the cell sites. The results of these measurements may then be fed back to the cell sites. The cell site having the highest value of the SINR is added (at 410) to a member list for the cell cluster associated with the mobile unit. Additional cell sites are then added (at 415) to the member list if they have a SINR that is above a threshold value. In various alternative embodiments, the threshold value may be predetermined or the threshold value may be dynamically determined, e.g., it may be selected based on the current measurements of the SINR and a desired number of cells in the cluster.

Interfaces between the selected cells may then be formed (at 420). For example, communication channels between the selected cells may be formed (at 420) using the backhaul network that interconnects the cells in the communication system. As discussed herein, these interfaces may be used to exchange information and coordinate/synchronize communication between the cluster cells and the mobile units. In one embodiment, interfaces between the selected cells and cells that are no longer in the cluster group may also be torn down. Once the appropriate interfaces have been formed (at 420) so that communication can be coordinated and/or synchronized, communication between the cluster cells and the mobile units can start (at 425).

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method of forming clusters of cells in a wireless communication system, comprising:
   accessing information generated by measuring a plurality of channel conditions for at least one mobile unit and a plurality of cells in the wireless communication system;
   adding more than one of the plurality of cells to at least one cell cluster based on the accessed information;
   establishing at least one interface to exchange information between the cells in said at least one cell cluster;
   synchronizing communication between the cells in said at least one cell cluster and said at least one mobile unit using timing reference signals transmitted between the cells over said at least one interface; and
   updating the cells in the at least one cell cluster by establishing or tearing down interfaces between pairs of cells based on measured values of channel conditions, wherein said updates are performed on a time scale determined by a coherence distance of multipath fading in the wireless communication system.

2. The method of claim 1, wherein accessing the information generated by measuring a plurality of channel conditions comprises accessing information indicating strengths of a plurality of signals received by said at least one mobile unit or the plurality of cells.

3. The method of claim 2, wherein accessing the information indicating the strengths of the plurality of signals comprises accessing a plurality of instantaneous signal strengths.

4. The method of claim 3, wherein accessing the information indicating the plurality of instantaneous signal strengths comprises accessing information indicating at least one of a distance-dependent path loss, shadow fading, or multipath fading between said at least one mobile unit and the plurality of cells.

5. The method of claim 2, wherein accessing the information indicating the plurality of strengths of the plurality of signals comprises accessing a plurality of local-average signal strengths.

6. The method of claim 5, wherein accessing the plurality of local-average signal strengths comprises accessing information indicating at least one of a distance-dependent path loss or shadow fading.

7. The method of claim 2, wherein accessing the information generated by measuring the plurality of channel conditions comprises measuring a level of interference at the plurality of cells.

8. The method of claim 7, wherein accessing the information generated by measuring the plurality of channel conditions comprises accessing a plurality of signal-to-interference-plus-noise ratios measured at the plurality of cells.

9. The method of claim 8, wherein adding more than one cell to said at least one cell cluster comprises adding a first cell to said at least one cell cluster, the first cell having a value of the signal-to-interference-plus-noise ratio that exceeds the values of the signal-to-interference-plus-noise ratios of the other cells.

10. The method of claim 9, wherein adding more than one cell to said at least one cell cluster comprises adding at least one second cell to said at least one cell cluster, said at least one second cell having a value of the signal-to-interference-plus-noise ratio that exceeds a threshold value of the signal-to-interference-plus-noise ratio.

11. The method of claim 10, wherein the threshold is dependent on the signal-to-interference-plus-noise ratio of said first cell.

12. The method of claim 1, wherein establishing said at least one interface between the cells in said at least one cell cluster comprises establishing communication channels between the cells using a backhaul network that interconnects the cells.

13. The method of claim 12, comprising transmitting the timing reference signals over said communication channels of said at least one interface.

14. The method of claim 1, wherein accessing the information generated by measuring the plurality of channel conditions comprises accessing information generated by measuring a plurality of uplink channel conditions, and wherein adding the cells to said at least one cell cluster comprises adding the cells to an uplink cell cluster, and wherein coordinating communication comprises coordinating communication over the uplink.

15. The method of claim 14, comprising measuring the uplink channel conditions.

16. The method of claim 1, wherein accessing the information generated by measuring the plurality of channel conditions comprises accessing information generated by measuring a plurality of downlink channel conditions, and wherein adding the cells to said at least one cell cluster comprises adding the cells to an downlink cell cluster, and wherein coordinating communication comprises coordinating communication over the downlink.

17. The method of claim 16, wherein accessing the information generated by measuring the plurality of downlink channel conditions comprises receiving feedback from said at least one of mobile unit indicating the information generated by measuring the plurality of downlink channel conditions.

18. The method of claim 16, wherein accessing the information generated by measuring the plurality of downlink channel conditions comprises accessing information generated by measuring a plurality of uplink channel conditions in a time multiplexed system.

19. A method of forming clusters of cells in a wireless communication system, comprising:
   establishing interfaces to exchange information between a plurality of cells in at least one cell cluster associated with a mobile unit, wherein cells are added to said at least one cell cluster in response to the mobile unit measuring a value of a channel condition for the cells that is above a threshold;
   synchronizing communication between the cells in said at least one cell cluster and the mobile unit using timing reference signals transmitted between the cells over the interfaces; and
   updating the cells in the at least one cell cluster by establishing or tearing down interfaces between pairs of cells based on measured values of channel conditions, wherein said updates are performed on a time scale determined by a coherence distance of multipath fading in the wireless communication system.

20. The method of claim 19, comprising tearing down at least one of the interfaces between a pair of cells in response to the mobile unit determining that the value of the channel condition for at least one of the pair of cells has fallen below the threshold.

21. The method of claim 19, wherein updating the cells in said at least one cell cluster on the time scale determined by the coherence distance comprises updating the cells in said at least one cell cluster on a time scale that ranges from milliseconds to tens of milliseconds.

22. The method of claim 19, wherein establishing said at least one interface between the cells in said at least one cell cluster comprises establishing communication channels between the cells using a backhaul network that interconnects the cells.

23. The method of claim 22, comprising transmitting the timing reference signals over the communication channels between the cells.

* * * * *